(12) United States Patent
Dittrich et al.

(10) Patent No.: US 6,956,670 B1
(45) Date of Patent: Oct. 18, 2005

(54) METHOD, SYSTEM, PROGRAM, AND DATA STRUCTURES FOR HALFTONING WITH LINE SCREENS HAVING DIFFERENT LINES PER INCH (LPI)

(75) Inventors: Danielle Kathyrn Dittrich, Longmont, CO (US); Joan LaVerne Mitchell, Longmont, CO (US); Fritz H. Obermeyer, Wellington, CO (US); Gerhard Robert Thompson, Wappingers Falls, NY (US); Chai Wah Wu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 09/696,106

(22) Filed: Oct. 24, 2000

(51) Int. Cl.[7] .............................. H04N 1/52; H04N 1/58
(52) U.S. Cl. ........................ 358/1.9; 358/533; 358/536
(58) Field of Search ................................ 358/3.06, 1.9, 358/3.09, 3.13, 3.2, 534, 533, 535, 536; 382/162, 382/270; 345/596

(56) References Cited

U.S. PATENT DOCUMENTS

| | | | |
|---|---|---|---|
| 5,055,923 A | * 10/1991 | Kitagawa et al. | ........... 358/534 |
| 5,542,031 A | 7/1996 | Douglass et al. | ........... 395/114 |
| 5,917,614 A | 6/1999 | Levien | ........... 358/456 |
| 5,917,951 A | 6/1999 | Thompson et al. | ......... 382/237 |
| 5,991,513 A | 11/1999 | Levien | ........... 395/109 |
| 6,025,930 A | 2/2000 | Thompson et al. | .......... 358/1.9 |
| 6,088,123 A | 7/2000 | Adler et al. | ................. 358/1.9 |
| 6,111,658 A | 8/2000 | Tabata | ........................ 358/1.9 |

OTHER PUBLICATIONS

Wayne Fulton, "A few scanning tips" Basics Part 6—www.scantips.com, Moire Interference—Scanning images in magazines/books/newspapers [online], pp. 1-3, 1997-8. [Originally retrieved on 2000-10-20] Retrieved from the Internet <URL: http://www.scantips.com/basics06.html>.

"Moire Patterns: What Are They and How to Get Rid of Them?" [online], DisplayMate for DOS Manual and DisplayMate for Windows Help Screens, 1990-2000, pp. 1-3. [Originally retrieved on 2000-10-20] Retrieved from the Internet <URL: http://www.displaymate.com/moire.html>.

Raph Levien, "Moire suppression: a white paper" [online], Sep. 20, 1997, pp. 1-5. [Originally retrieved on 2000-10-20] Retrieved from the Internet <URL: http://www.levien.com/moire/whitepaper.html>.

U.S. Appl. No. 09/666,947, filed Sep. 20, 2000 Entitled "Method, System, and Program for Half Toning Data for Rendering in a Multitone Output Device".

* cited by examiner

*Primary Examiner*—Scott A. Rogers
(74) *Attorney, Agent, or Firm*—David W. Victor; Konrad Raynes & Victor LLP (57) ABSTRACT

Provided is a method, system, program, and data structures for halftoning an input image comprised of at least two input color components. Each input color component provides input intensity values for the color component at pixel locations in the image. At least two halftoning screens are accessed. There is one screen for each color component and halftone output generated by at least one of the screens has a lines per inch (LPI) that is at least approximately twenty percent different than the LPI of halftone output generated by one other screen. The input image is separated into the separate color components. The accessed screen for each color component is applied to the input intensity values for the color component to produce output intensity values for the color component. The combined halftone outputs for all the color components form the output pixels.

50 Claims, 5 Drawing Sheets

FIG. 1a
Prior Art

Halftoned
Yellow (Y) Output

Halftoned
Black (K) Output

Halftoned
Cyan (C) Output

Halftoned
Magenta (M) Output

FIG. 1b
Prior Art

Halftoned
Yellow (Y) Output

Halftoned
Black (K) Output

Halftoned
Cyan (C) Output

Halftoned
Magenta (M) Output

Halftoned
Yellow (Y) Output

Halftoned
Black (K) Output

Halftoned
Cyan (C) Output

Halftoned
Magenta (M) Output

FIG. 4

METHOD, SYSTEM, PROGRAM, AND DATA STRUCTURES FOR HALFTONING WITH LINE SCREENS HAVING DIFFERENT LINES PER INCH (LPI)

CROSS-REFERENCE TO RELATED APPLICATIONS

This application is related to the following co-pending and commonly-assigned patent application entitled "Method, System, and Program for Halftoning Data in a Multitone Output Device", to Michael Thomas Brady and Joan L. Mitchell, having Ser. No. 09/666,947 and filed on Sep. 20, 2000. This patent application is incorporated herein by reference in its entirety.

BACKGROUND OF THE INVENTION

1. Field of the Invention

The present invention relates to a method, system, program, and data structures for halftoning color components of an input image to improve the quality of the rendered output.

2. Description of the Related Art

Digital images may use one or more bits to describe the color intensity at each pixel. The term "pixel" as used herein refers to one or more intensity inputs, where an intensity is expressed with one or more bits, at a data point that represents data to be rendered (i.e., printed, displayed, etc.), where the data to be rendered may include, but is not limited to, images, text, composite images, graphs, collages, scientific data, video, etc. A pel is a picture element point that may be expressed with one bit. If only one bit is used to express the intensity, then the image is a bilevel image where there are two possible intensity values per pixel, such as black and white or full saturation and no intensity.

Color images are often expressed using three or more color components, such as cyan (C), magenta (M), yellow (Y), and black (K), or some combination thereof. Typically an image is stored as 8 bits per color component representing 256 intensity levels per pixel per color component. Also typically, a digital print apparatus is bilevel meaning that only two intensity levels per color component are available for output. Halftoning is the standard technique used to achieve the appearance of many intensity levels while actually using a lesser number of rendering levels. A common method of halftoning is to apply a halftone screen to each color hcomponent. Halftone output consists of various size dots on a square grid. The number of parallel lines through the dots per inch is the halftone screen frequency measured in lines per inch, LPI. The angle the parallel lines form with the vertical axis is the screen angle of the halftone output.

One common form of a dithering algorithm involves the use of a threshold matrix of values with which the intensity values for a color component (CMYK) are compared. The same matrix pattern is employed repeatedly to cover the image. The binary output value, i.e., a color or black or absence of any component, for the bi-level printer is based on a comparison of whether the input intensity value for the color component is greater or less than the threshold intensity. The commonly assigned patents entitled "Clustered Aperiodic Mask", having U.S. Pat. No. 5,917,951 and "Multicell Clustered Mask with Blue Noise adjustments", having U.S. Pat. No. 6,025,930, provide techniques for creating the threshold matrix.

As the frequency of the pattern of dots in the halftone output increases, the printed dots become less noticeable and a uniform intensity is perceived by the human eye. Thus, it is desirable to have a high screen frequency which is also within the capability of the output device. However, the higher the screen frequency, the more difficult it is to construct halftone output that can render a full range of gray values.

For color images, each color component is usually screened at the same frequency. If some misalignment of these screens occurs, objectionable moire patterns form. Moiré patterns are a visible artifact comprised of a lower beat frequency resulting from the superposition of two or more higher frequency patterns. The lower frequency moiré pattern is more easily detected by the human eye and results in objectionable output. Therefore, where screen misalignment can occur, color component screens are rotated from the vertical axis at various angles before being superimposed in order to reduce moiré patterns. It has been found that two screens of the same frequency rotated at 30 degrees with respect to each other have the least moiré artifacts. Therefore, when color printing using cyan, magenta, yellow, and black (C, M, Y, and K) components, a 30 degree rotation between the (C, M, and K) screens is used because these colors are more visible than yellow. Because screens are invariant under a 90 degree rotation, the Y screen cannot also be separated from the others by 30 degrees, so it is placed between two of the other screens with a 15 degree rotation.

Figure 1A:
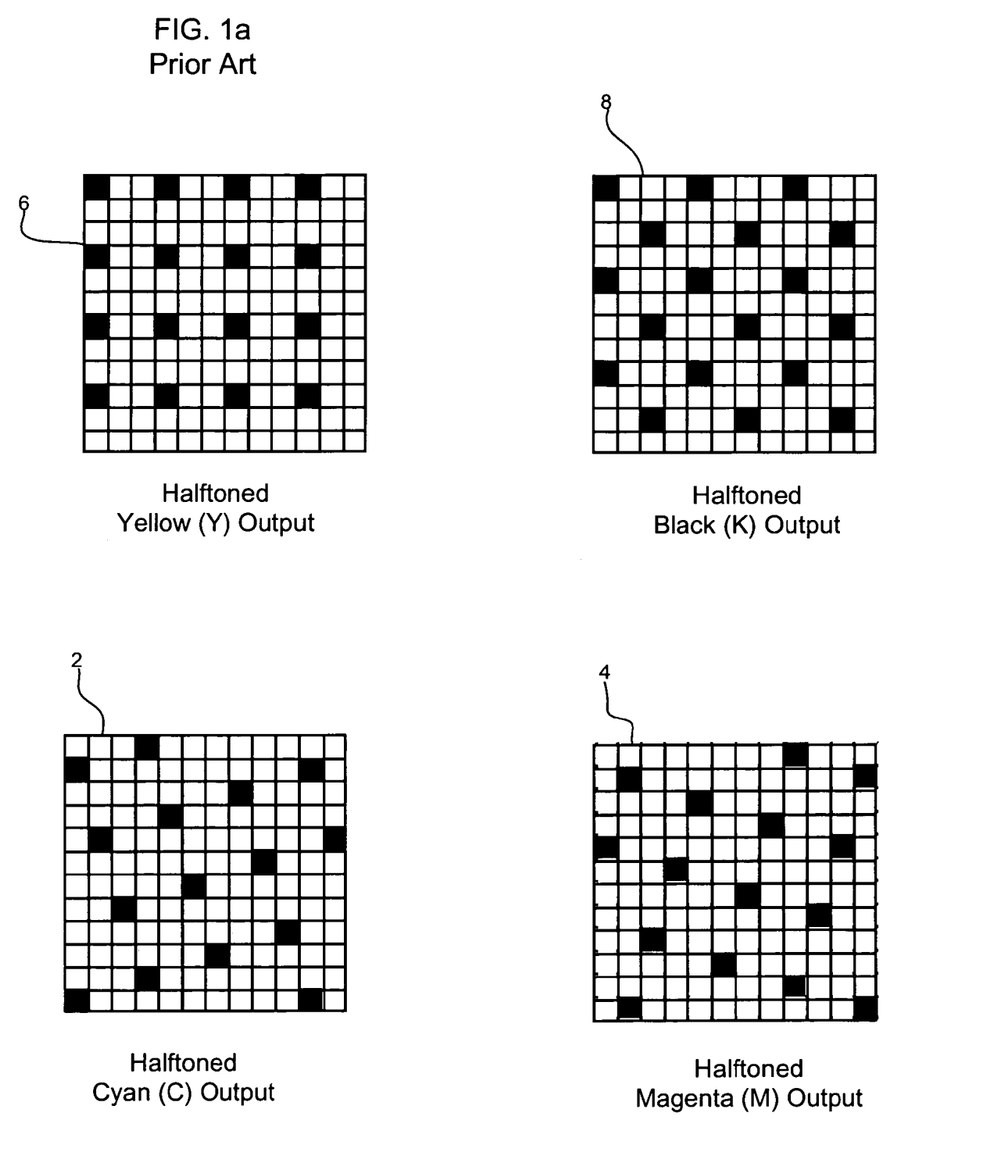
FIGS. 1a and 1b illustrate output generated with threshold matrices (halftone screens) for CMYK color components of pixels in an image in a manner known in the prior art.

FIG. 1a illustrates an example of halftone outputs 2, 4, 6, 8 that are representative of (C,M,Y,K) color components with one printed value per basic cell. A threshold matrix screen is used to transform an input intensity value for one color component (C, M, Y or K), that may comprise eight bits to represent multiple intensity values, to a one bit intensity value for the color component, i.e., zero (no intensity) or one (full intensity). In the halftone outputs 2, 4, 6, 8 illustrated in FIG. 1a, the black dots represent output values that are rendered at full intensity, and the blank spaces between the black dots represent intensity values having zero intensity. Prior art halftoning algorithms produce halftone output having approximately the same lines per inch (LPI) or screen frequency, and vary the angles at which the halftone output is rotated for different color components. In the prior art, the LPI for the halftone outputs for the color components will not differ by more than fifteen percent.

Figure 1B:
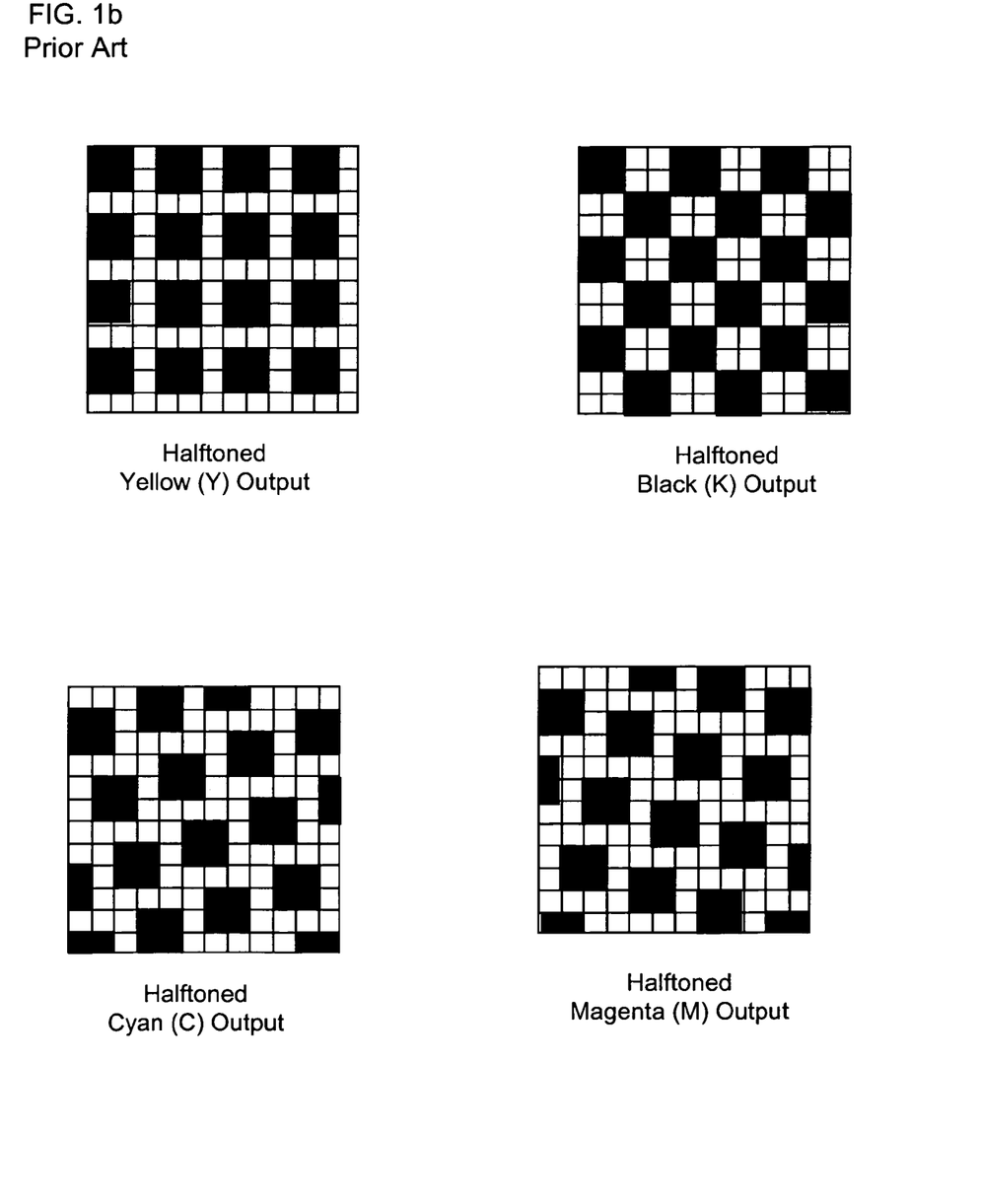

FIG. 1b illustrates prior art halftone output that is denser than the output illustrated in FIG. 1a. The output shown in FIG. 1b has four printed values per basic cell.

In the illustrated prior art halftone output arrangement shown in FIGS. 1a, b, the cyan (C) output is rotated 15 degrees, the magenta (M) output is rotated negative 15 degrees, the yellow (Y) output is rotated zero degrees, and the black (K) output is rotated 45 degrees. However, the output may be rotated by the halftoning algorithm at other angles to improve the quality of the rendered image. Further, in FIG. 1a, the yellow output 6 has two white dots between every two horizontal and vertical black dots; the cyan 2 and magenta 4 halftone output there are two white dots between every two consecutive black dots at a 15 degree angle; and the black output 8 has one white dot between every two consecutive black dots at a 45 degree angle.

If there are more than four visible color components, i.e., halftone outputs, then it has been observed by those in the art that it is difficult to find enough suitable angles to print. Therefore, there is a need in the art to increase the number of ways to superimpose screens upon one another without forming objectionable moiré patterns.

SUMMARY OF THE PREFERRED EMBODIMENTS

Preferred embodiments describe a method, system, program, and data structures for halftoning an input image comprised of at least two input color components. Each input color component provides input intensity values for the color component at pixel locations in the image. At least two halftoning screens are accessed. There is one screen for each color component and at least one of the screens generates halftone output having a lines per inch (LPI) that is at least approximately twenty percent different than the LPI of the halftone output generated by one other screen. The input image is separated into the separate color components.

The accessed screen for each color component is applied to the input intensity values for the color component to produce output intensity values for the color component. The combined output intensity values for all the color components form the output pixels.

In further embodiments, the input image may include four color components, such as cyan (C), magenta (M), yellow (Y), and black (K). Still further, the halftone output generated by the screen for the black (K) color component may have an LPI that is at least approximately 20% greater than the LPI of the halftone output generated by at least one of the other cyan (C), magenta (M), and yellow (Y) screens.

In still further embodiments, the halftone output generated by one of the screens may be rotated at a zero angle and the halftone outputs generated from two of the other screens are rotated from the vertical axis in different directions at first and second angles greater than zero, and the halftone output with the greater LPI is rotated from the vertical axis at a fourth angle. The fourth angle may be approximately equal to zero or less than 45 degrees.

In yet further embodiments, the halftoning screens may comprise threshold matrices. In such cases, applying the screen to the input intensity values for each color component would involve comparing the input intensity value to a corresponding threshold intensity value in the threshold matrix for the color component, and then outputting a first output intensity value if the input intensity value is less than the corresponding threshold intensity value or outputting a second output intensity value if the input intensity value is greater than or equal to the threshold intensity value.

Preferred embodiments utilize halftoning screens that produce halftone output such that the halftone output produced by at least one of the screens has an LPI or screen frequency that is at least approximately 20% different than the halftone output generated by one of the other screens. Using such a halftone screen arrangement has been found to improve the quality and reduce the moiré effect when the rendered halftone outputs are combined to form the final pixel output.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
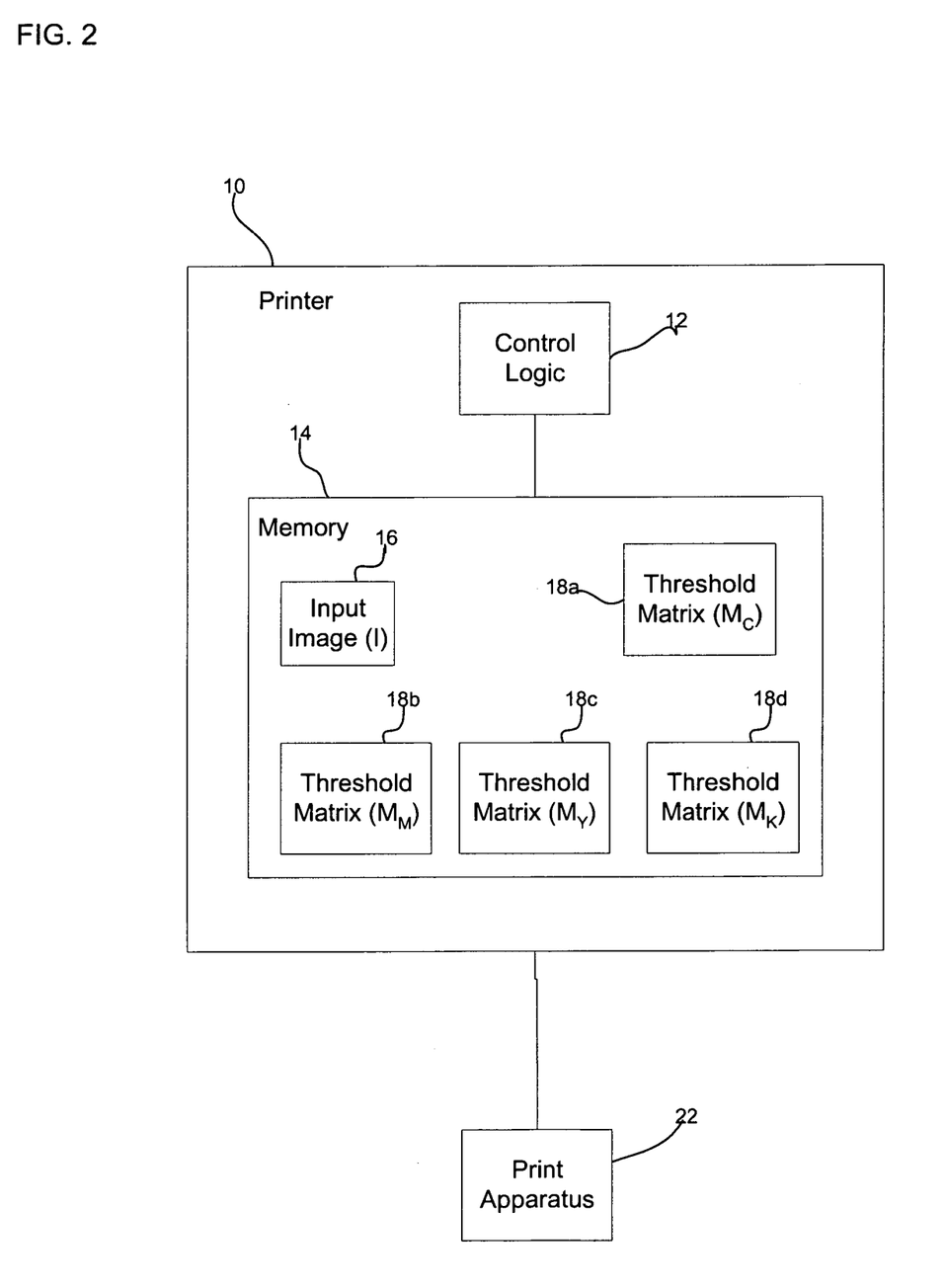
FIG. 2 illustrates a computing environment in which preferred embodiments are implemented.

FIG. 2 illustrates a printing computing environment in which preferred embodiments are implemented. A printer 10 includes control logic 12 to perform the preferred embodiment halftoning operations. The printer 10 may control a bi-level print apparatus capable of producing only two levels (zero or full intensity) of two or more color components, (e.g., C, M, Y, or K), or a multi-tone print apparatus capable of producing multiple tones of any one of a plurality of color components. The control logic 12 may comprise a programmable chip, such as a field programable gate array (FPGA) chip, which includes logic. A memory device 14 includes input image 16. The input image 16 comprises scan lines of pixels comprised of one or more color components.

In the described embodiments, the input image 16 is comprised of four color planes (C, M, Y, and K), where the intensity value for each color component is defined with multiple bits, e.g., eight bits. However, in further embodiments, there may be two, three, four or more color components, depending on the number of colors available in a print apparatus 22. The print apparatus 22 would comprise any paper feeder and printing mechanism known in the art, including a laser beam, charged-coupled device (CCD), ink jets, material deposition, etc.

The memory device 14 further includes one threshold matrix for each color component $M_C$, $M_M$, $M_Y$, $M_K$ 18a, b, c, d. The memory device 14 may comprise any high speed memory device known in the art, such as a static random access memory (SRAM), random access memory (RAM), etc.

In preferred embodiments, the control logic 12 accesses an input image I 16 comprised of (C, M, Y, and K) color components from memory 14 and applies the threshold matrix 18a, b, c, d for the respective color components to produce halftone output representing either no printing or a full saturation value of the color component that the print apparatus 22 is capable of printing. If the print apparatus 22 can print multiple intermediate values of a color as well as zero and full saturation, then the halftone output value may comprise multiple bits to represent one of the possible intensities that the print apparatus 22 can render.

In preferred embodiments, the threshold matrices $M_C$, $M_M$, $M_Y$, $M_K$ 18a, b, c, d comprise a point algorithm as the intensities rendered for the color component of each pixel location do not depend on the value of the color component for neighboring pixels. This is in contrast to neighborhood algorithms, such as error diffusion, which require consideration of neighboring input intensity values to determine the image to be printed. In general, point algorithms are faster and require less data storage then neighborhood algorithms. However, those skilled in the art will appreciate that the threshold matrices 18a, b, c, d may comprise a type of algorithm different than a point algorithm, including an algorithm that considers neighbor values, or any other algorithm known in the art.

Figure 3:
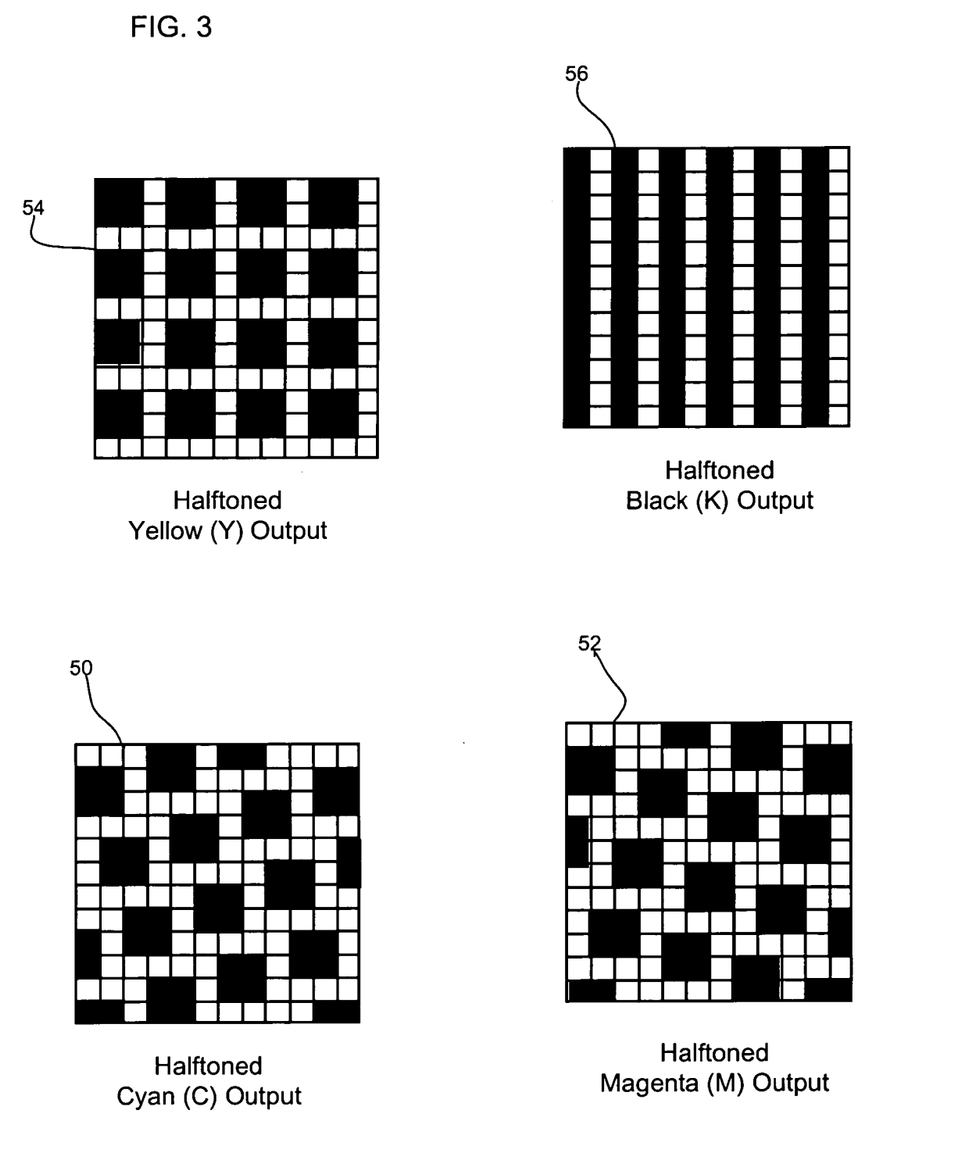
FIG. 3 illustrates output generated with threshold matrices (halftone screens) for CMYK color components of pixels in an image in a accordance with preferred embodiments of the present invention.

FIG. 3 illustrates an example of halftone output 50, 52, 54, and 56 generated by the threshold matrices $M_C$, $M_M$, $M_Y$, $M_K$ 18a, b, c, d in accordance with the preferred embodiments. The values in the threshold matrices 18a, b, c, d are generated to produce the desired halftone output 50, 52, 54, and 56 shown in FIG. 3 in a manner known in the art. The threshold matrices may be tuned for each color component in a manner known in the art. Thus, the dimensions of the threshold matrices and the intensity values contained therein may differ for each color component. Further, the (C, M, and Y) halftone output 50, 52, and 54 shown in FIG. 3 is produced at angles in a manner known in the art and all have the same lines per inch (LPI) or screen frequency. However, the halftone output for K (black) 56 has a greater LPI than the other three halftone outputs 50, 52, 54, such as at a ratio of 3:2 or 4:2 LPIs, or some integer multiple of the other LPIs. The halftone output for K (black) 56 is generated to include the same LPI and 45 degree angle as the black (K) threshold output shown in FIG. 1a plus added output to increase the LPI of the threshold matrix for K to a desired ratio, e.g., 3:2, 4:2, etc., with respect to the other halftone outputs (C, M, and Y). In the example of FIG. 3, the K threshold matrix 56 generates three black dots between two vertically consecutive black dots shown in FIG. 1b to form solid vertical columns of dots with one column of white dots therebetween. In alternative embodiments, the LPI of the halftone output generated by any one of the threshold matrices $M_C$, $M_M$, $M_Y$, $M_K$ is at least approximately 20% greater than the halftone output generated by the other three threshold matrices. The angles at which the halftone output is rotated may be determined in an appropriate manner known in the art.

It has been found that generating a significantly different LPI from one of the threshold matrices substantially reduces the likelihood of a moiré effect when the halftone outputs are produced by the printer 22. It has also been found that excellent output results are achieved when: the halftone output has an LPI that is approximately an integer multiple of the LPI of the other halftone outputs and is rotated at an angle of 45 degrees; the halftone output with the larger LPI is greater than the LPI of the other halftone outputs by a ratio of approximately 3:2 and the halftone output with the greater LPI is rotated approximately zero degrees; and the halftone output with the larger LPI is greater than the LPI of the other halftone outputs by approximately 4:2 and the halftone output with the greater LPI is rotated approximately zero to 45 degrees. Still further, good output results have been observed when one halftone output has an LPI greater than 50% of the LPI of one other halftone output, and the halftone outputs are at approximately the same angle or angles differing by a small amount, e.g. ±30 degrees.

Figure 4:
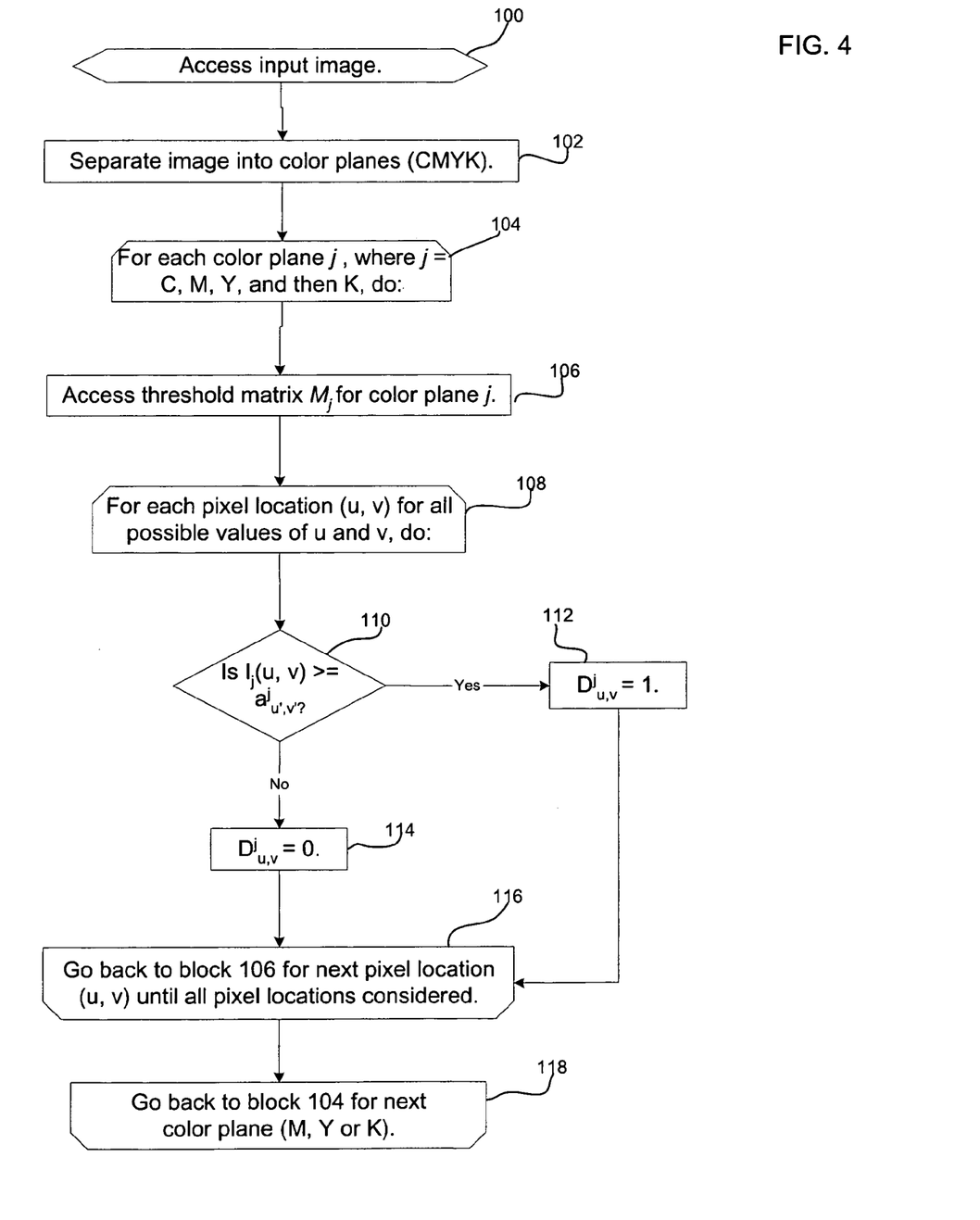
FIG. 4 illustrates logic to screen data using the threshold matrices shown in FIG. 3 in accordance with preferred embodiments of the present invention.

FIG. 4 illustrates logic to apply the threshold matrices $M_C$, $M_M$, $M_Y$, $M_K$ 18a, b, c, d to the color components of the pixels in the input image 16 to produce halftone output values. The input image 16 is represented as $I^j_{u,v}$, where (u, v) indicates a pixel location in the image for color component j, where in the described embodiments, j can be (C, M, Y or K). If there are eight bits used for each color component, then the input image value for one color component may comprise one of 256 different values. Control begins at block 100 with the control logic 12 accessing the input image I and separating (at block 102) the input image I into its four color components (C, M, Y, K), $I_C$, $I_M$, $I_Y$, $I_K$, where $I_C = \{I^C(u,v)\}$
$I_M = \{I^M(u,v)\}$
$I_Y = \{I^Y(u,v)\}$
$I_K = \{I^K(u,v)\}$ for all pixel locations (u, v) in the image I.

After separating the I image into its four color component parts $I_C$, $I_M$, $I_Y$, $I_K$, the control logic 12 then begins a loop at block 104 to perform the steps at blocks 106 through 116 for each color component j of the image, e.g., CMYK. Thus, j is set to one of the color components (C, M, Y, and K) for each iteration of the loop from blocks 104 to 118. Within this first loop (blocks 104 to 118), the control logic 12 accesses (at block 106) the threshold matrix $M_j$ 18a, b, c, or d for the color component j. The threshold matrix $M_j = \{a^j_{(x,y)}\}$ is an m×n matrix, where a is the value in the threshold matrix at location (x, y). After accessing the threshold matrix $M_j$, the control logic 12 then begins an inner loop at block 108 to perform blocks 110 through 114 for each possible pixel location (u, v) in the image I. Within this inner loop for each pixel location (u, v), the control logic 12 determines (at block 110) whether the $I^j_{(u,v)}$ value for the color component j at location (u, v) is greater than or equal to $a^j_{(u',v')}$, where u'=u mod m, and v'=v mod n and m and n define the dimensions of the m×n threshold matrix $M_j$. In number theory, v mod n stands for the remainder of the division of v by n. If (at block 110) the image intensity value $I^j_{(u,v)}$ is greater than or equal to $a^j_{(u',v')}$, then (at block 112) the output decision value for the pixel location (u, v), or $D^j_{u,v}$ is equal to one; otherwise (at block 114) $D^j_{u,v}$ is equal to zero.

Repeating the inner loop at blocks 106 to 116 generates an intensity value for each pixel location (u, v) in each color plane (C, M, Y, K) of the image I. The halftone output data is then sent to the print apparatus 22 for rendering.

In the described embodiments, the intensity value for color image j at each color component location, $I^j_{(u,v)}$, can comprise an eight bit value. In alternative embodiments, a different number of bits may be used to express the intensity value for one input color component or plane. The threshold matrix would include values that have the same number of bits used to express the intensity values for the input image for the color component $I_j$. The result of the comparison operation at block 110 is an output of one of two values, one or zero, indicating to use full or zero intensity for the color component j. This described embodiment assumes the printer is only capable of rendering two values for each color component, zero or full intensity.

In alternative embodiments, the printer apparatus 22 may be capable of printing intermediate intensities in addition to full and zero intensity. For instance, there are printers that can print multiple intensities for a black color component, i.e., shades of grey. In such case, another decision matrix may be applied to the output of the comparison of the threshold matrix and the input intensity value to produce an output intensity representing either no printing, one of the multiple intermediate intensities, or a full saturation value (black) that the print apparatus 22 is capable of printing for the particular color component. For instance, if the print apparatus 22 can print intermediate values as well as full saturation, then the output value would comprise multiple bits to represent one of the multiple output intensities. The co-pending and commonly assigned patent application entitled "Method, System, and Program for Halftoning Data in a Multitone Output Device", which was incorporated by reference above, describes how to apply a decision matrix after the compare operation of the threshold matrix to produce an output value for one of the intensities capable of being rendered by the printer 22.

With the preferred embodiments, interference in the rendered image, such as moiré interference, is reduced by increasing the LPI of the halftone output generated by one of the halftone screens, e.g., threshold matrices, for one of the color components by a factor of at least approximately 20% of the LPI of the halftone output generated by one of the other halftone screens for another color component in the image. In further embodiments, the halftone outputs with the different LPIs may be generated at different angles to further minimize moiré interference. For instance, it has been found that rotating the halftone output with the smaller LPI and the halftone output with the 20% greater LPI at a zero angle and rotating the other halftone outputs at an angle greater than zero has produced particularly good results.

What follows are some alternative implementations for the preferred embodiments.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In described embodiments, the halftone output with the higher LPI, had an LPI ratio of 3:2, 4:2 or an integer multiple with respect to the other three threshold matrices. In alternative embodiments, different ratios may be used, as long as the halftone output generated by one threshold matrix has an LPI that is different than the LPI of the halftone output generated one other matrix by at least approximately 20%.

In described embodiments, the C, M and Y halftone outputs were at standard angles, i.e., ±15 degrees for the C and M matrices, zero degrees for the Y matrix. In alternative embodiments, non-standard angles for the halftone outputs may be used in order to improve the reduction of the moiré effect in the output. Further, it has been found that with the preferred embodiments, that the moiré effect is further reduced if the halftone output having the higher LPI is rotated at a zero degree angle, or angle less than 30 degrees.

In described embodiments only the halftone output generated by one matrix had a greater LPI than the halftone output generated by the other matrices. In further embodiments, the halftone outputs generated by two or more matrices may have greater LPIs, with the same or different greater LPIs.

In described embodiments, the K halftone output generated by the K threshold matrix had the greater LPI. In further embodiments, one of the C, M or Y matrices may generate the halftone output with the greater LPI.

In the described embodiments, the logic of FIG. 4 utilized a comparison operation to apply the threshold matrices to the input image intensities. In alternative embodiments different algorithms known in the art may be used to apply the threshold matrices to the input image intensities to produce halftone outputs capable of being rendered by the printer. In still further embodiments, the screen matrices applied to the input color components may comprise a matrix other than a threshold matrix use to screen the input data.

Preferred embodiments were described with respect to a printer output device. However, the output values may be rendered using output devices other than printers, such as such as display monitors, a storage device for future rendering, a transmission device, etc.

In preferred embodiment, the control logic is implemented as hardware, e.g., a Field Programmable Gate Array (FPGA), Application Specific Integrated Circuit (ASIC), etc. In alternative embodiments, the control logic may be implemented as programmable code in a programmable processor.

As discussed, the input image may comprise any number of color components, e.g., CMYK, CMY or any other combination of color components, including color components other than CMYK, and may have more than four color components.

The memory 14 may be implemented in one memory chip or dispersed throughout multiple memory chips. In alternative embodiments, the matrices 18a, b, c, d may be maintained in a magnetic memory, as opposed to an electronic memory 14. Still further, the matrices 18a, b, c, d may be encoded in hardware logic, such as ASICs, FPGAs, Electronically Erasable Programmable Read-Only-Memory (EEPROM), etc.

In preferred embodiments the range of intensity inputs is greater than the range of output intensities capable of being rendered on the output device or printer. In alternative embodiments, the range of intensity inputs may be less than the range of intensity outputs.

Preferred embodiments described a halftoning (screening) process that used a threshold matrix. However, those skilled in the art will appreciate that numerous halftone algorithms may be applied to transform the input image to output intensity values that can be rendered by the printer.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for halftoning an input image comprised of at least two input color components, wherein each input color component provides input intensity values for the color component at pixel locations in the image, comprising:

accessing at least two halftoning screens, wherein there is one screen for each color component, and wherein at least one of the screens generates halftone output having a lines per inch (LPI) that is at least approximately twenty percent different than the LPI of halftone output generated by one other screen;

separating the input image into the separate color components; and applying the accessed screen for each color component to the input intensity values for the color component to produce the halftone output for the color component, wherein the combined halftone output for all the color components form the output pixels in a manner that reduces a moire effect.

2. The method of claim 1, wherein the input image includes four color components.

3. The method of claim 2, wherein the halftone outputs generated by three of the screens have a same LPI and the halftone output generated by one screen has an LPI that is at least approximately 20% different than the LPI of the halftone outputs generated by the other three screens.

4. The method of claim 2, wherein the four color components comprise cyan (C), magenta (M), yellow (Y), and black (K).

5. The method of claim 4, wherein the halftone output generated by the screen for the black (K) color component has an LPI that is at least approximately 20% greater than the LPI of the halftone output generated by at least one of the other cyan (C), magenta (M), and yellow (Y) screens.

6. The method of claim 4, wherein the halftone output generated by one of the screens is rotated at a zero angle and the halftone outputs generated by two of the other screens are rotated in different directions at second and third angles greater than zero, and the halftone output generated with greater LPI is rotated at a fourth angle, wherein the screens are rotated from the vertical axis.

7. The method of claim 6, wherein the fourth angle is approximately equal to zero.

8. The method of claim 6, wherein the fourth angle is approximately less than twenty degrees.

9. The method of claim 1, wherein the LPIs of the halftone outputs generated by at least two of the screens have a ratio of approximately 3:2 or 4:2 or the LPI of the halftone output generated by at least one screen is approximately an integer multiple of the LPI of the halftone output generated by at least one other screen.

10. The method of claim 9, wherein the LPI of the halftone output generated by at least one screen is approximately the integer multiple of the LPI of the halftone output generated by at least one other screen, and wherein the halftone output with the integer multiple LPI is rotated at approximately a 45 degree angle.

11. The method of claim 9, wherein the LPI of the halftone output generated by at least one screen is less than approximately 50% more than the LPI of the halftone output generated by at least one other screen, and wherein the halftone output with the 50% greater LPI is rotated at approximately an angle less than approximately 30 degrees.

12. The method of claim 1, wherein the screens comprise threshold matrices including threshold intensity values.

13. The method of claim 12, wherein applying the screen to the input intensity values for each color component comprises:

comparing the input intensity value to a corresponding threshold intensity value in the threshold matrix for the color component;

outputting a first output intensity value if the input intensity value is less than the corresponding threshold intensity value; and outputting a second output intensity value if the input intensity value is greater than or equal to the corresponding threshold intensity value.

14. The method of claim 13, wherein the first and second output intensity values are capable of indicating zero intensity or full intensity for the color component.

15. The method of claim 12, wherein applying the screens to the intensity values for each color component comprises:

comparing the input intensity value to a corresponding threshold intensity value in the threshold matrix for the color component; and outputting one of at least three output intensity values in a multi-tone output device which is capable of rendering based on an outcome of comparing the input intensity value to the corresponding threshold intensity value.

16. The method of claim 15, wherein the image is separated into four color components.

17. A system for halftoning an input image comprised of at least two input color components, wherein each input color component provides input intensity values for the color component at pixel locations in the image, comprising:

a memory storing at least two halftoning screens, wherein there is one screen for each color component, and wherein at least one of the screens generates halftone output having a lines per inch (LPI) that is at least approximately twenty percent different than the LPI of halftone output generated by one other screen;

means for separating the input image into the separate color components; and means for applying the screen for each color component to the input intensity values for the color component to produce the halftone output for the color component, wherein the combined halftone output for all the color components form the output pixels in a manner that reduces a moire effect.

18. The system of claim 17, wherein the input image includes four color components.

19. The system of claim 18, wherein the halftone outputs generated by three of the screens have a same LPI and the halftone output generated by one screen has an LPI that is at least approximately 20% different than the LPI of the halftone outputs generated by the other three screens.

20. The system of claim 18, wherein the four color components comprise cyan (C), magenta (M), yellow (Y), and black (K).

21. The system of claim 20, wherein the halftone output generated by the screen for the black (K) color component has an LPI that is at least approximately 20% greater than the LPI of the halftone output generated by at least one of the other cyan (C), magenta (M), and yellow (Y) screens.

22. The system of claim 20, wherein the halftone output generated by one of the screens is rotated at a zero angle and the halftone outputs generated by two of the other screens are rotated in different directions at second and third angles greater than zero, and the halftone output generated with greater LPI is rotated at a fourth angle, wherein the screens are rotated from the vertical axis.

23. The system of claim 22, wherein the fourth angle is approximately equal to zero.

24. The system of claim 22, wherein the fourth angle is approximately less than twenty degrees.

25. The system of claim 17, wherein the LPIs of the halftone outputs generated by at least two of the screens have a ratio of approximately 3:2 or 4:2 or the LPI of the halftone output generated by at least one screen is approximately an integer multiple of the LPI of the halftone output generated by at least one other screen.

26. The system of claim 25, wherein the LPI of the halftone output generated by at least one screen is approximately the integer multiple of the LPI of the halftone output generated by at least one other screen, and wherein the halftone output with the integer multiple LPI is rotated at approximately a 45 degree angle.

27. The system of claim 25, wherein the LPI of the halftone output generated by at least one screen is less than approximately 50% more than the LPI of the halftone output generated by at least one other screen, and wherein the halftone output with the 50% greater LPI is rotated at approximately an angle less than approximately 30 degrees.

28. The system of claim 17, wherein the screens comprise threshold matrices including threshold intensity values.

29. The system of claim 28, wherein the means for applying the screen to the input intensity values for each color component performs:
   comparing the input intensity value to a corresponding threshold intensity value in the threshold matrix for the color component;
   outputting a first output intensity value if the input intensity value is less than the corresponding threshold intensity value; and
   outputting a second output intensity value if the input intensity value is greater than or equal to the corresponding threshold intensity value.

30. The system of claim 29, wherein the first and second output intensity values are capable of indicating zero intensity or full intensity for the color component.

31. The system of claim 28, wherein the means for applying the screens to the intensity values for each color component performs:
   comparing the input intensity value to a corresponding threshold intensity value in the threshold matrix for the color component; and
   outputting one of at least three output intensity values in a multi-tone output device which is capable of rendering based on an outcome of comparing the input intensity value to the corresponding threshold intensity value.

32. The system of claim 17, wherein the image is separated into four color components.

33. An article of manufacture including logic for halftoning an input image comprised of at least two input color components, wherein each input color component provides input intensity values for the color component at pixel locations in the image, wherein the logic halftones the input image by:
   accessing at least two halftoning screens, wherein there is one screen for each color component, and wherein at least one of the screens generates halftone output having a lines per inch (LPI) that is at least approximately twenty percent different than the LPI of halftone output generated by one other screen;
   separating the input image into the separate color components; and
   applying the accessed screen for each color component to the input intensity values for the color component to produce the halftone output for the color component, wherein the combined halftone output for all the color components form the output pixels in a manner that reduces a moire effect.

34. The article of manufacture of claim 33, wherein the input image includes four color components.

35. The article of manufacture of claim 34, wherein the halftone outputs generated by three of the screens have a same LPI and the halftone output generated by one screen has an LPI that is at least approximately 20% different than the LPI of the halftone outputs generated by the other three screens.

36. The article of manufacture of claim 34, wherein the four color components comprise cyan (C), magenta (M), yellow (Y), and black (K).

37. The article of manufacture of claim 36, wherein the halftone output generated by the screen for the black (K) color component has an LPI that is at least approximately 20% greater than the LPI of the halftone output generated by at least one of the other cyan (C), magenta (M), and yellow (Y) screens.

38. The article of manufacture of claim 36, wherein the halftone output generated by one of the screens is rotated at a zero angle and the halftone outputs generated by two of the other screens are rotated in different directions at second and third angles greater than zero, and the halftone output generated with a greater LPI is rotated at a fourth angle, wherein the screens are rotated from the vertical axis.

39. The article of manufacture of claim 38, wherein the fourth angle is approximately equal to zero.

40. The article of manufacture of claim 38, wherein the fourth angle is approximately less than twenty degrees.

41. The article of manufacture of claim 33, wherein the LPIs of the halftone outputs generated by at least two of the screens have a ratio of approximately 3:2 or 4:2 or the LPI of the halftone output generated by at least one screen is approximately an integer multiple of the LPI of the halftone output generated by at least one other screen.

42. The article of manufacture of claim 41, wherein the LPI of the halftone output generated by at least one screen is approximately the integer multiple of the LPI of the halftone output generated by at least one other screen, and wherein the halftone output with the integer multiple LPI is rotated at approximately a 45 degree angle.

43. The article of manufacture of claim 41, wherein the LPI of the halftone output generated by at least one screen is less than approximately 50% more than the LPI of the halftone output generated by at least one other screen, and wherein the halftone output with the 50% greater LPI is rotated at approximately an angle less than approximately 30 degrees.

44. The article of manufacture of claim 33, wherein the screens comprise threshold matrices including threshold intensity values.

45. The article of manufacture of claim 44, wherein applying the screen to the input intensity values for each color component comprises:
   comparing the input intensity value to a corresponding threshold intensity value in the threshold matrix for the color component;
   outputting a first output intensity value if the input intensity value is less than the corresponding threshold intensity value; and
   outputting a second output intensity value if the input intensity value is greater than or equal to the corresponding threshold intensity value.

46. The article of manufacture of claim 45, wherein the first and second output intensity values are capable of indicating zero intensity or full intensity for the color component.

47. The article of manufacture of claim 44, wherein applying the screens to the intensity values for each color component comprises:
- comparing the input intensity value to a corresponding threshold intensity value in the threshold matrix for the color component; and
- outputting one of at least three output intensity values in a multi-tone output device which is capable of rendering based on an outcome of comparing the input intensity value to the corresponding threshold intensity value.

48. The article of manufacture of claim 47, wherein the image is separated into four color components.

49. The article of manufacture of claim 33, wherein the logic is implemented as code in a computer readable medium accessible to a processor that executes the code.

50. The article of manufacture of claim 33, wherein the logic is implemented as circuitry within an integrated circuit chip.

* * * * *